US012692106B2

(12) United States Patent
Simpson

(10) Patent No.: US 12,692,106 B2
(45) Date of Patent: Jul. 28, 2026

(54) LOADING DOCK DETECTION SYSTEM

(71) Applicant: Toyota Material Handling, Inc.,
Columbus, IN (US)

(72) Inventor: Anthony Brian Simpson, Columbus,
IN (US)

(73) Assignee: Toyota Material Handling, Inc.,
Columbus, IN (US)

( * ) Notice: Subject to any disclaimer, the term of this
patent is extended or adjusted under 35
U.S.C. 154(b) by 107 days.

(21) Appl. No.: 18/472,736

(22) Filed: Sep. 22, 2023

(65) Prior Publication Data

US 2024/0101366 A1 Mar. 28, 2024

Related U.S. Application Data

(60) Provisional application No. 63/376,681, filed on Sep.
22, 2022.

(51) Int. Cl.
B65G 69/28 (2006.01)
B65G 69/00 (2006.01)

(52) U.S. Cl.
CPC ....... B65G 69/2882 (2013.01); B65G 69/003
(2013.01); B65G 69/2805 (2013.01); B65G
69/28 (2013.01)

(58) Field of Classification Search
CPC .. B65G 69/2882; B65G 69/003; B65G 69/28;
B65G 69/2805; G05D 1/0225
See application file for complete search history.

(56) References Cited

U.S. PATENT DOCUMENTS

| | | | | |
|---|---|---|---|---|
| 4,214,266 A | * | 7/1980 | Myers | B60Q 9/007 |
| | | | | 348/148 |
| 6,069,558 A | * | 5/2000 | Kershaw | G01S 17/931 |
| | | | | 340/436 |
| 2006/0051196 A1 | * | 3/2006 | McDonald | B65G 69/005 |
| | | | | 414/401 |
| 2006/0181391 A1 | * | 8/2006 | McNeill | G05B 15/02 |
| | | | | 340/5.7 |
| 2015/0009046 A1 | * | 1/2015 | Senfleben | G09F 21/04 |
| | | | | 340/901 |
| 2015/0294166 A1 | * | 10/2015 | Kuehnle | B60Q 9/007 |
| | | | | 382/104 |
| 2016/0039340 A1 | * | 2/2016 | Schantz | B60Q 9/008 |
| | | | | 340/435 |
| 2017/0043967 A1 | * | 2/2017 | Walford | A61B 1/00098 |
| 2017/0101278 A1 | * | 4/2017 | Stone | B65G 69/00 |
| 2019/0144218 A1 | * | 5/2019 | Hoofard | G06F 3/048 |
| | | | | 52/173.2 |
| 2020/0126331 A1 | * | 4/2020 | Kishita | G07C 9/00896 |
| 2020/0290587 A1 | * | 9/2020 | Duffy | B60T 17/22 |

* cited by examiner

*Primary Examiner* — Thomas D Alunkal
(74) *Attorney, Agent, or Firm* — Husch Blackwell LLP

(57) ABSTRACT

A loading dock safety detection system and method is
provided. The detection system includes a plurality of com-
ponents that are coupled to the material handling vehicle.
The system includes one or more sensors, and a feedback
device. The sensor is coupled to the mast and positioned to
sense the environment in front of the material handling
vehicle and to view the status of the loading dock. The
detection system includes a processing device that is
coupled to the body and determines, based on data from the
sensors, the status of the loading dock and the corresponding
loading dock components. The processing device deter-
mines if the status is in an acceptable or unacceptable
condition and notifies the operator via a feedback device
accordingly.

19 Claims, 4 Drawing Sheets

360

400

410

Sensors scan loading dock area for loading dock components

420

Send data to processing device

430

Detect presence of loading dock components in sensors' data

435

Unacceptable condition ?

Yes

No

440

Determine status of dock components

450

Activate feedback device

455

Unacceptable condition ?

Yes

No

460

Sensors continue scanning loading dock area

LOADING DOCK DETECTION SYSTEM

CROSS-REFERENCES TO RELATED APPLICATIONS

This application claims priority under 35 U.S.C. § 119 to U.S. Provisional Patent Application No. 63/376,681, filed Sep. 22, 2022, the entire contents of which are incorporated herein by reference.

BRIEF SUMMARY

This disclosure generally relates to material handling vehicles. More specifically, this disclosure relates to material handling vehicles equipped with a vision or detection system.

BACKGROUND

Conventional material handling vehicles, like forklifts, can experience various accidents while operating on a loading dock, which is an opening in a warehouse or shipping facility where the pavement of the driveway leading up to the loading dock has been raised or lowered in such a way to make the floor of the warehouse or shipping facility level with the floor of the trailer or vehicle that is shipping or receiving cargo. Some examples of loading dock separation accidents include, but are not limited to trailer creep, early departure, trailer pop up, and landing gear collapse.

Trailer creep is when a truck or trailer rolls away from the dock because of the forces imposed by forklifts driving in and out. Early departure is when the truck driver drives away while a forklift is entering, exiting, or inside the trailer. Trailer pop up is when the rear of the truck or trailer lifts up, away from the loading dock while a forklift is inside the truck or trailer. Landing gear collapse is when a landing gear leg of the trailer collapses and the trailer leans or tips over. In some applications, a dock lock tethers the truck or trailer to the loading dock, preventing the truck or trailer from moving. This greatly reduces the risk of loading dock separation accidents. However, if the dock lock is not engaged, it cannot tether the truck or trailer to the dock. Conventional systems require the manual checking of the status of the dock lock, dock plate, and trailer position.

SUMMARY

Some embodiments provide a loading dock door safety detection system. To detect if a loading dock lock is engaged, material handling vehicles may use a single sensor or scanner or an array of scanners and sensors working in conjunction with a processing device or other computational device. In some forms, the sensors are positioned towards the front of the material handling vehicle so that a dock lock light, other features surrounding the loading dock, and all potential safety hazards are in the view of the sensors as the material handling vehicle approaches the dock.

Some embodiments provide a method of detecting a loading dock status. The method includes receiving sensor information corresponding to a first status of a loading dock lock indicator, the loading dock lock indicator indicating a vehicle restraint status, receiving sensor information corresponding to a second status of a dock plate, receiving sensor information corresponding to a third status of a dock door, determining the first status of the loading dock lock indicator, determining the second status of the dock plate, determining the third status of the dock door, and notifying a vehicle operator via a sensory feedback device if one or more of the first status, the second status, or the third status are in an unacceptable first reference condition, an unacceptable second reference condition, or an unacceptable third reference condition respectively.

In some forms, the first status is whether an illumination element of the loading dock lock indicator is one of illuminated or not illuminated, and the unacceptable first reference condition is a lack of illumination of the illumination element. In some forms, the first status is whether an illumination element of the loading dock lock indicator is illuminated in one of a first color or a second color, and the unacceptable first reference condition is the illumination element being illuminated in the second color. In some forms, the second status is one of a presence or an absence of the dock plate, and the unacceptable second reference condition is the absence of the dock plate. In some forms, the second status is a height of the dock plate, and the unacceptable second reference condition is the dock plate being one of higher or lower than a threshold height value. In some forms, the third status is a width value of a light gap between a docking vehicle and the dock door, and the unacceptable third reference condition is the width value of the light gap being greater than a threshold gap width value. In some forms, the sensor information comprises image data captured from a camera of a material handling vehicle. In some forms, the sensory feedback device is one or more of an auditory alarm or a visual alarm. In some forms, the dock plate is one of a hydraulic, pneumatic, or mechanical dock leveler.

Some embodiments provide a dock door safety detection system for a material handling vehicle. The dock door safety detection system includes a vision system and a feedback device. The vision system includes one or more sensors configured to detect one or more loading dock components and a processor configured to determine a status of a loading dock. The processor is communicatively coupled to the one or more sensors. The feedback device is configured to provide a notification in response to the processor determining that the one or more loading dock components is in an unacceptable condition, the notification being one or more of visual, auditory, or tactile.

In some forms, the feedback device includes an illumination element, the notification is whether the illumination element is one of illuminated or not illuminated, and a lack of illumination of the illumination element indicates that the one or more loading dock components is in the unacceptable condition. In some forms, the feedback device is an illumination element, the notification is whether the illumination element is illuminated in one of a first color or a second color, and the illumination element being illuminated in the second color indicates that the one or more loading dock components is in the unacceptable condition. In some forms, the processor is configured to determine a drive direction of the material handling vehicle and disregard the determination of the one or more loading dock components being in the unacceptable condition if the material handling vehicle is traveling away from the loading dock. In some forms, the processor is configured to determine a distance value between the material handling vehicle and the one or more loading dock components and disregard the status of the loading dock if the distance value is above a distance threshold. In some forms, the unacceptable condition is determined by way of the processor comparing a detected condition of the one or more loading dock components to an unacceptable condition reference. In some forms, the unacceptable condition reference is configurable via a user interface of a mobile device. In some forms, the processor is configured to determine a dock plate height and indicate the unacceptable condition if the dock plate height is one of higher or lower than a threshold value. In some forms, the processor is configured to determine a width value of a light gap between the material handling vehicle and a dock door and indicate the unacceptable reference condition if the width value of the light gap is greater than a threshold gap width value.

Some embodiments provide a material handling vehicle including a processor and a feedback device. The processor is communicatively coupled to a sensor and configured to determine a status of a loading dock based on data from the sensor, the feedback device is communicatively coupled to the processor and configured to provide a notification, the notification being one or more of visual, auditory, or tactile based on the status of the loading dock. In some forms, the material handling vehicle includes a body, an operator cab, a seat, or a mast. In some forms, one or more of the processor, the sensor, or the feedback device are selectively attachable to one or more of the body, the operator cab, the seat, or the mast.

DETAILED DESCRIPTION

Figure 1:
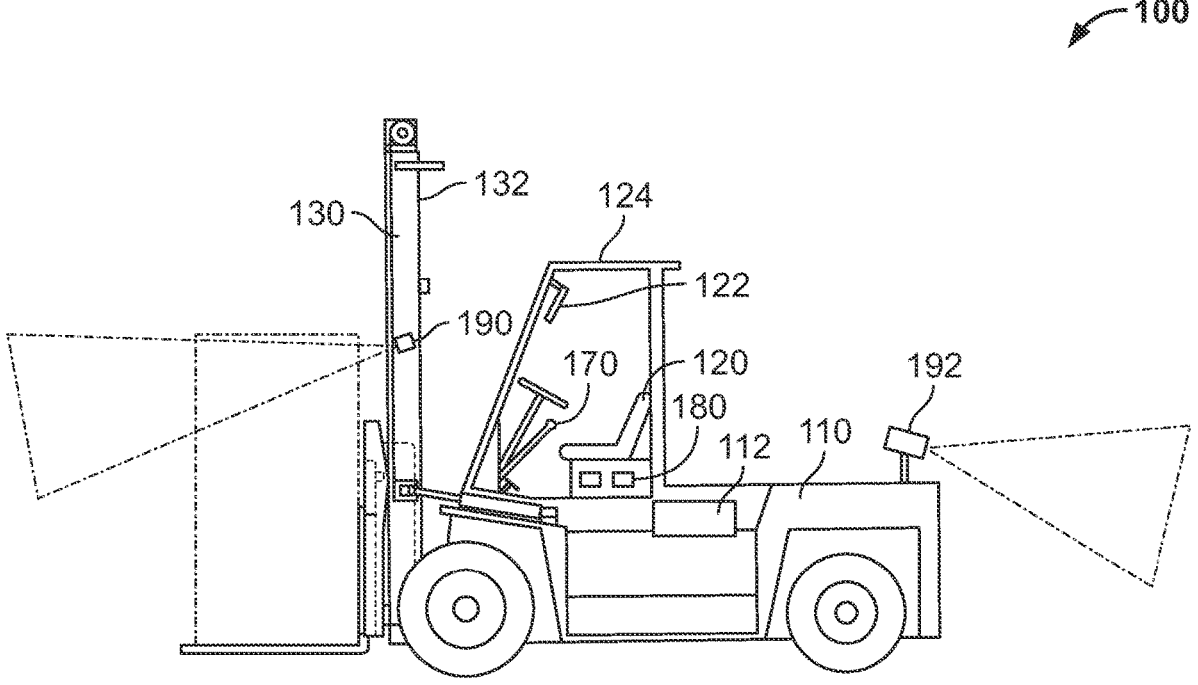
FIG. 1 is a side elevation view of a material handling vehicle according to one embodiment.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

It is to be understood that the phraseology and terminology used herein is for the purpose of description and should not be regarded as limiting. For example, the use of "including," "comprising," or "having" and variations thereof herein is meant to encompass the items listed thereafter and equivalents thereof as well as additional items. As used herein, unless otherwise specified or limited, the terms "mounted," "connected," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

FIG. 1 illustrates a material handling vehicle 100 according to one embodiment. The material handling vehicle 100 can comprise a body 110, an operator cab 124, a driver's seat 120, a mast 130, a processor 112, one or more feedback devices 180, a display module 122, and a control module 170. In some embodiments, the material handling vehicle 100 is operated by a driver who sits in the driver's seat 120, but in some other forms, the material handling vehicle 100 can operate autonomously or via remote control. In the manual driver operation form, the driver can use the control module 170 to control the material handling vehicle 100, and the control module 170 can be provided in the form of a control lever. For example, the control module 170 could be used to shift the material handling vehicle 100 into forward or backward motions. There may be other control levers or instruments not pictured that the driver may use to direct the material handling vehicle 100 in different ways pursuant to the task at hand.

The material handling vehicle 100 includes a vision system that comprises the processor 112, one or more front facing sensors 190, and one or more rear facing sensors 192. The processor 112, the front facing sensor 190, the rear facing sensor 192, and a feedback device 180 are all communicatively coupled to one another and can exchange information via a wired or wireless configuration. In some forms, the vision system includes its own processor, and the vision system and the feedback devices 180 are modular with respect to the material handling vehicle 100. Accordingly, the vision system and the feedback devices 180 can be selectively attachable to the material handling vehicle 100 and selectively communicatively coupled with the processor 112 of the material handling vehicle 100. In this way, the vision system and the feedback devices 180 can be retrofitted onto a number of different types of material handling vehicles. The feedback devices 180 can be configured to alert the driver by auditory, visual, and/or tactile means including, but not limited to, sirens, horns, announcements, lights, strobes, images, vibrations, deacceleration, and/or pulsations. The feedback device 180 can, in some instances, display data or an alert on the display module 122. The above list of feedback means is in no way meant to be exhaustive.

The front facing sensor 190 and the rear facing sensor 192 can be provided in the form of one or more cameras, laser scanners, accelerometers, gyro sensors, proximity sensors, radars, lidars, optical sensors (such as infrared sensors), acoustic sensors, barometers, thermometers, or other suitable sensors or any combination thereof. The front facing sensor 190 is positioned to sense the environment in front of and/or to the sides of the material handling vehicle 100 and can be attached to the mast 130 or another portion of the front end of the material handling vehicle 100. The rear facing sensor 192 is positioned to sense the environment behind and/or to the sides of the material handling vehicle 100 and can be positioned on the rear end of the body 110, for example.

Both the front facing sensor 190 and the rear facing sensor 192 can sense various parameters of the environment surrounding the material handling vehicle 100, such as visual, auditory, or other environmental features, generate sensor data, and can communicate the corresponding sensor data with the processor 112 of the material handling vehicle 100. For example, the front facing sensor 190 and the rear facing sensor 192 can capture still or continuous images and provide the corresponding image data to the processor 112 for analysis. The processor 112 can then send control signals to activate the feedback device 180 based on the analysis performed on the sensor data from the front facing sensor 190 and the rear facing sensor 192. In response to activation by the processor 112, the feedback device 180 can provide notifications in the form of auditory, visual, or tactile sensory notifications. The notifications can be provided in the form of various alarms that alert the operator of the material handling vehicle 100 as to the conditions of the surrounding environment. The feedback device 180 may positioned in a number of locations such as on or near the seat 120, the operator cab 124, or anywhere else on the body 110, in order to facilitate notifying the operator or surrounding persons.

Figure 2:
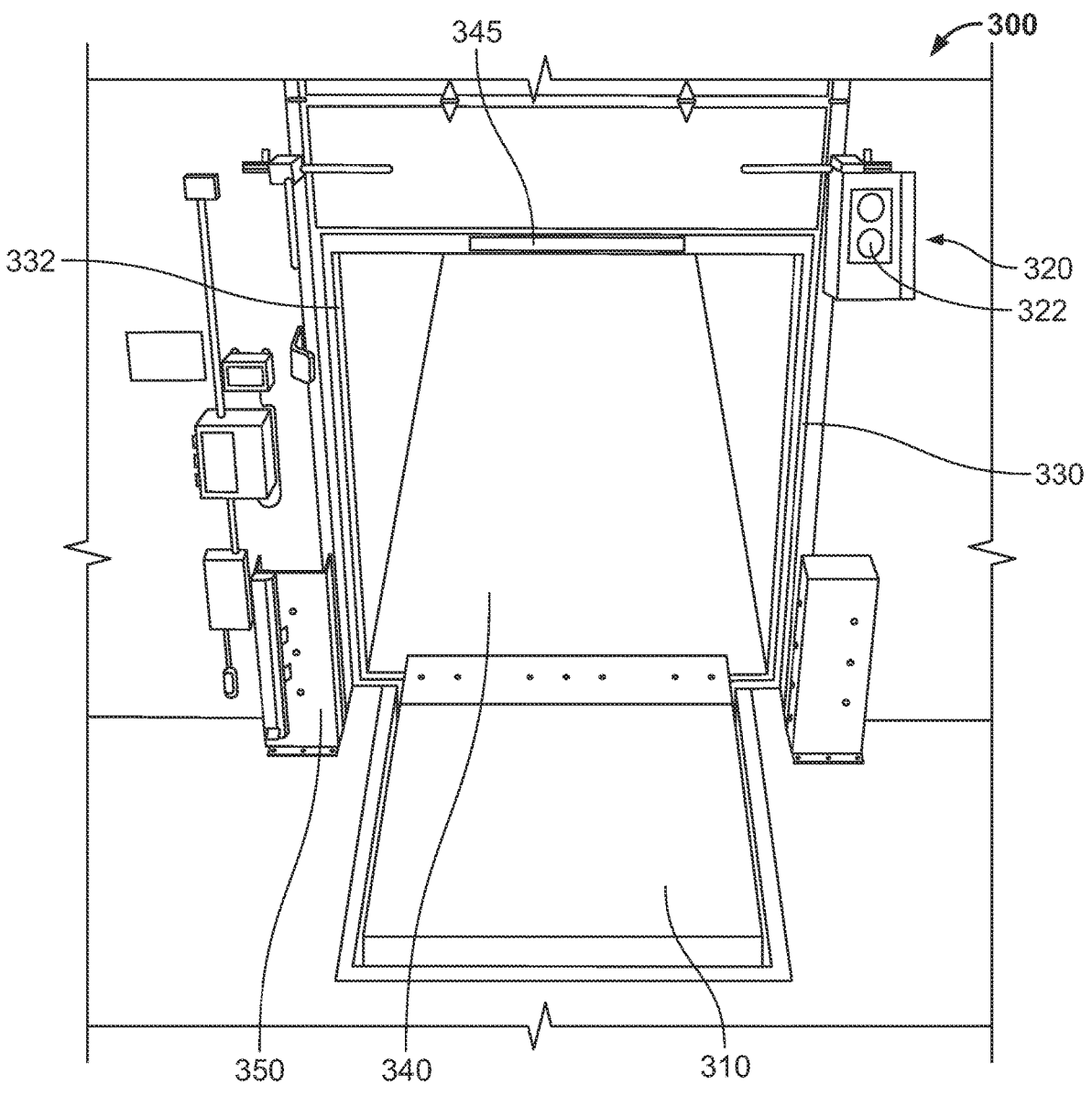
FIG. 2 is a front view of the inside of a conventional loading dock.
Figure 3:
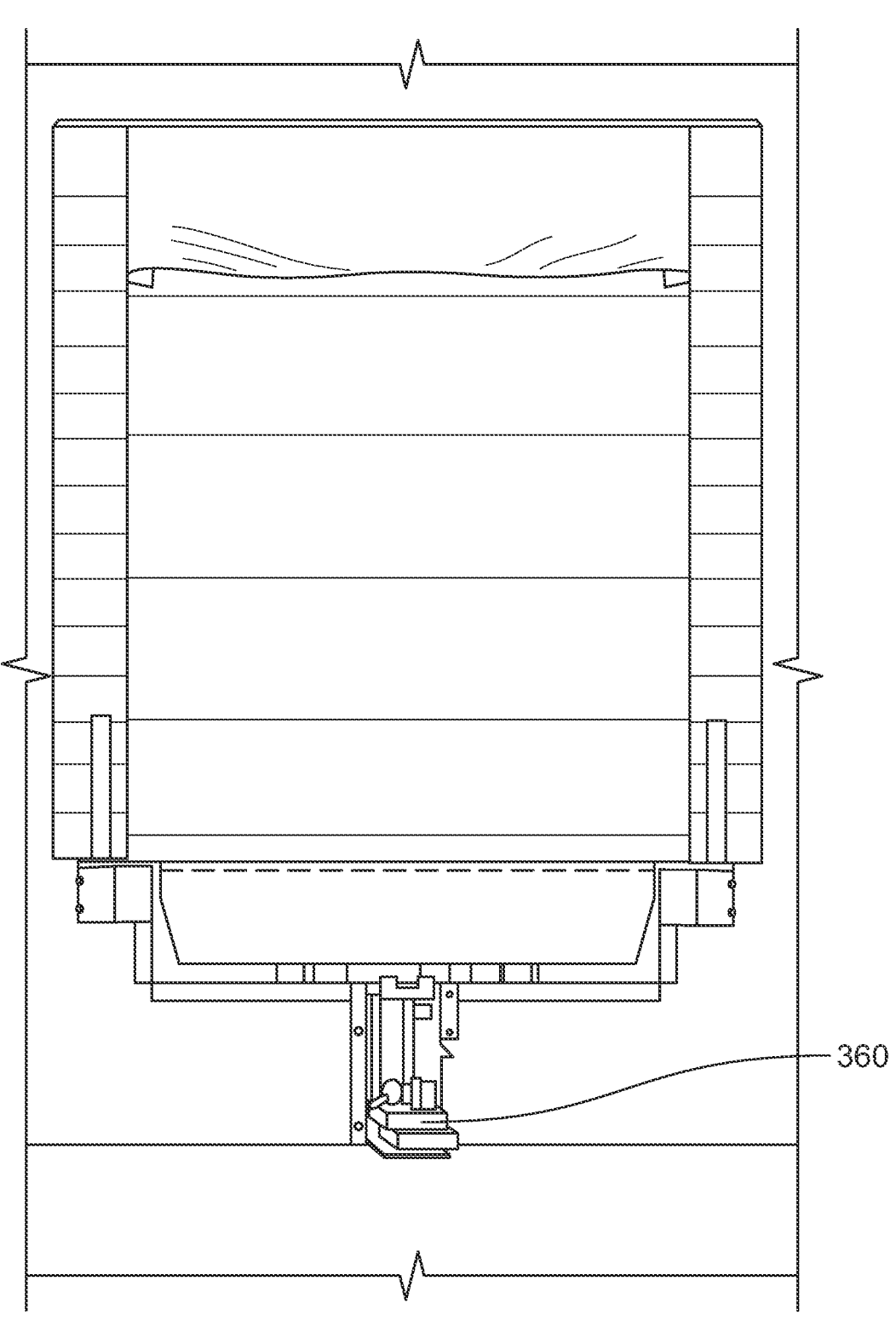
FIG. 3 is a front view of the outside of a conventional loading dock.

FIGS. 2 and 3 illustrate an inside view and an outside view, respectively, of a conventional loading dock 300. The loading dock 300 includes a loading dock opening 330, a dock plate 310, a trailer 340, a light gap 332, a dock door indicator 345, a bollard or post 350, a dock lock indicator 320, and a vehicle restraint 360 (FIG. 3). The dock plate 310 is coupled to the floor adjacent to the loading dock opening 330 and is meant to provide a level surface to the bridge the gap between the trailer 340 and the loading dock opening 330. In some forms, one edge of the dock plate 310 comes into close contact with a lip of the trailer 340, such that the dock plate 310 is level with the trailer 340. The dock plate 310 can be provided in the form of a portable aluminum piece that accommodates light loads like pallet jacks, dollies, hand trucks, and carts. In some other forms, the dock plate 310 can be provided in the form of a permanent steel fixture and configured to handle heavy machinery and forklifts. Further, the dock plate 310 may be hydraulically, pneumatically, and/or mechanically actuated to be moved in a variety of directions. Accordingly, the dock plate 310 can be a removable or a permanent installation at the loading dock site. In some embodiments, the dock plate 310 has a textured surface with various bumps or ridges to improve traction. It should be understood that the loading dock 300 can include one or more fiducial markers or external positioning systems that are identifiable by the front facing sensor 190 and the rear facing sensor 192 to help indicate detection positioning for the sensors 190, 192 and/or indicate various conditions of the loading dock 300. For example, various fiducial markers can be used in addition to, or instead of, the dock lock indicator 320 to indicate whether the vehicle restraint 360 is properly fastened to the trailer 340 or help the sensors 190, 192 determine where in the environment certain conditions should be detected. In some forms, fiducial markers can be used so that the front facing sensor 190 and the rear facing sensor 192 are able to properly identify other safety hardware, which is specific to the loading dock 300, that indicates various conditions of the loading dock 300.

In some other forms, the dock plate 310 can include fiducial markers or high visibility markings along its edges so that the front facing sensor 190 and the rear facing sensor 192, and surrounding persons, can identify the outer perimeter of the dock plate 310. As a result, the sensors 190, 192, and persons near the dock plate 310, can more easily identify if there are any hazards or discontinuities where the dock plate 310 meets with or adjoins the surrounding loading dock floor. Further, the dock plate 310 is visible from the perspective looking into the loading dock 300 from inside the trailer 340 while it is docked. Accordingly, if the material handling vehicle 100 is operated within the docked trailer 340, the dock plate 310 is detectable by the sensors 190, 192. As briefly mentioned above, in the event of a loading dock separation accident, the dock plate 310 can shift so that it is no longer level with the trailer 340 and/or no longer sufficiently bridges the gap between the trailer 340 and the loading dock opening 330 such that the material handling vehicle 100 can safely travel between the trailer 340 and the loading dock 300.

In some embodiments, a dock lock indicator 320 and/or other fiducial marker is positioned on the wall beside the loading dock opening 330 and can include one or more illumination elements 322. The illumination element 322 can be configured to light up in various intensities, colors, and patterns to indicate different loading dock statuses. For example, the illumination element 322 can alternate between being illuminated in two different colors. The illumination element 322 can illuminate in the color green to indicate that the vehicle restraint 360 is properly restraining the trailer from moving or shifting relative to the dock, or the illumination element 322 can illuminate in the color red to indicate that the vehicle restraint 360 is not properly restraining the trailer. In some forms, the illumination element 322 may not be illuminated at all. Thus, a user may configure (e.g., selectively enable and disable) appropriate alerts and safety features based on the environment and surroundings of the facility in which the material handling vehicle 100 is used.

In some embodiments, the loading dock opening 330 is sized and shaped to allow a light gap 332 between the perimeter of the loading dock opening 330 and the edge of the trailer 340 when the trailer 340 is properly restrained in front of the loading dock opening 330. The presence of the light gap 332 can indicate that the trailer 340 is present in the loading dock 300, and the width of the light gap 332 can indicate whether the trailer 340 is lined up correctly with the loading dock opening 330 and properly secured to the vehicle restraint 360. In some embodiments, when viewed from inside the trailer 340 looking toward the loading dock 300 or vice versa, the width of the light gap 332 indicates that the trailer 340 is properly restrained. In this instance, various other features of the loading dock opening 330 and the outer perimeter of the trailer 340 can also be used to confirm whether the trailer 340 has been properly restrained In some forms, fiducial markers can be used to help identify where the front facing sensor 190 and the rear facing sensor 192 should focus in order to detect the light gap 332.

In some embodiments, the dock door indicator 345 can assist in indicating the height of the dock door with respect to the dock plate 310. The dock door indicator 345 can be provided in the form of one or more lighting elements, patterned designs, colored strips of tape, reflective elements, or any other fiducial markers configured to be identifiable by the vision system described above. In some forms, a corresponding second dock door indicator can be provided on the dock plate 310 in or near the loading dock opening 330 to provide a relative distance measurement value corresponding to the height of the dock door.

In some embodiments, a bollard or post 350 is coupled to the floor adjacent the opening of the loading dock opening 330 and adjacent to the dock plate 310. According to one embodiment, the bollard 350 may be a prefabricated concrete installation with a round cross-section, but it may also be made of steel construction with a rectangular or square cross-section. The bollard 350 may be brightly painted or include other visual indicators to aid in high visibility or fiducial markers to aid in detection by the front facing sensor 190 and the rear facing sensor 192. There may be a variable number of expected or unexpected obstructions around the loading dock opening 330 that are not limited in size, type, number, or nature.

Figure 4:
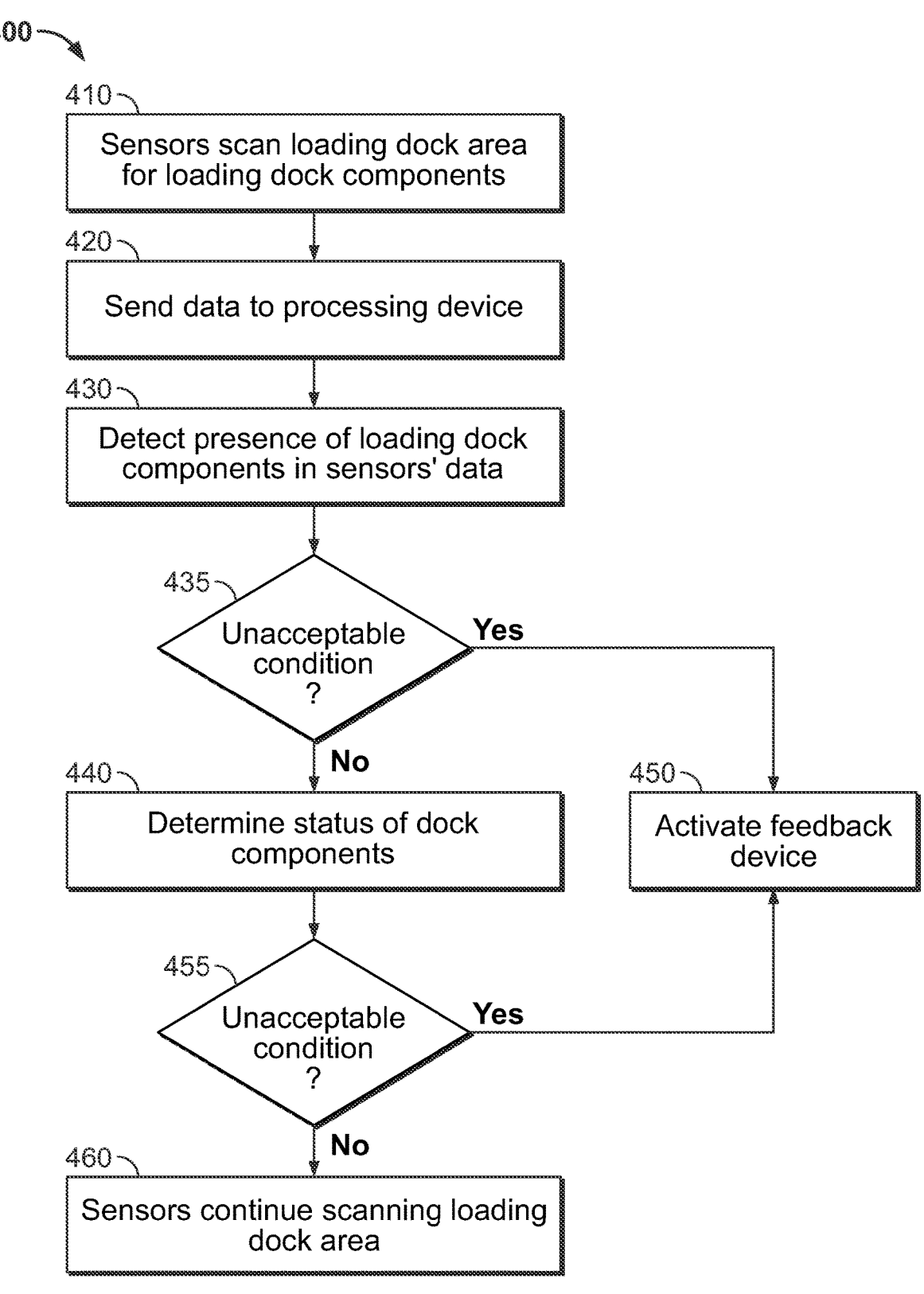
FIG. 4 is a block diagram showing of a method for detecting a loading dock status according to one embodiment.

FIG. 4 shows an example embodiment of a method 400 of detecting the status of the loading dock 300. In step 410, the sensors 190, 192 scan the loading dock 300 for any of the loading dock components including, but not limited to, the loading dock opening 330, the dock plate 310, the trailer 340, the light gap 332, the dock door indicator 345, the bollard or post 350, the dock lock indicator 320, or other fiducial markers and generates corresponding sensor data. In some embodiments, the bollard 350 can be used as a reference point to indicate the position of the dock plate 310 relative to the loading dock opening 330 or as a reference point to determine the position, location, or existence of the other components of the loading dock 300. In step 420, the sensors 190, 192 send the sensor data, which can include image data, video data, laser information, acceleration data, proximity data, radar or lidar data, infrared data, acoustic data, and thermal data, among other forms of detection data, to the processor 112. In step 430, the processor 112 determines the presence or absence of the various loading dock components by comparing the sensor data to preprogrammed parameters and/or preprogrammed reference conditions that pertain to each specific loading dock component. In some forms, this comparison includes the use of artificial intelligence, such as computer vision and/or a deep learning algorithm.

In step 435, the processor 112 determines if the presence or absence of certain loading dock components matches with preprogrammed presence or absence reference conditions, and, thus, whether there is an acceptable or unacceptable loading dock condition. In some forms, the presence of particular loading dock components corresponds with an unacceptable reference condition, for example, if the loading dock door is closed, and in some forms, the absence of a particular loading dock component corresponds with an unacceptable reference condition, for example, if certain illumination elements 322 are not detected. In some embodiments, the presence or absence of the loading dock component is categorized as an acceptable reference condition. If the presence or absence of certain loading dock components corresponds with an acceptable loading dock condition, the method 400 moves on to step 440. If, however, the presence or absence of certain loading dock components corresponds with an unacceptable loading dock condition, the method 400 moves on to step 450, which is explained further below.

Further, in some embodiments, step 435 includes a determination of the vehicle orientation, drive direction, speed, and/or distance, and these parameters are included as part of the presence or absence reference conditions. Accordingly, even if the presence or absence reference condition determines that the loading dock components correspond with an unacceptable condition, the material handling vehicle 100 might be traveling in a direction or be positioned at a distance which makes the unacceptable condition irrelevant. For example, if the loading dock door is closed or the dock plate 310 is missing, but the material handling vehicle is away from the loading dock 300 at a distance value that is above a distance threshold (such as 100 ft), stopped, traveling away from the loading dock 300, or traveling on a course that will not result in any interaction between the material handling vehicle 100 and the loading dock 300, the processor 112 can disregard the detected loading dock components and loading dock component statuses and skip to step 460 for the sensors 190, 192 to continue scanning for loading dock components.

In step 440, after verification of the presence of the loading dock component, the processor 112 then determines the status of the loading dock components by performing a calculation or computation based upon an algorithm or image processing method. In some forms, this computation includes the use of artificial intelligence, such as computer vision and/or a deep learning algorithm. Subsequently, in step 455, the processor 112 can categorize the status of the loading dock components as being in an acceptable condition or an unacceptable condition based upon a set of preprogrammed reference parameters or reference conditions. The reference conditions for each component of the loading dock 300 is component-specific and several examples of steps 440 and 455 are provided below with respect to selected loading dock components.

With respect to determining the status of the dock lock indicator 320 in step 440, the processor 112 determines if the dock lock indicator 320 is illuminated in one or more colors, such as a first color or a second color. In step 455, the processor 112 then compares the detected color with a set of known data to determine what color the dock lock indicator 320 is illuminated in and can determine whether status of the dock lock indicator 320 is in an acceptable condition or an unacceptable condition. For example, the dock lock indicator 320 may be illuminated in a red color, which as explained above, indicates the vehicle restraint 360 is not properly engaged. Accordingly, if the processor 112 determines that the dock lock indicator 320 is illuminated in a red color, the processor 112 will determine that the status of the dock lock indicator 320 is in an unacceptable condition. In other instances, the dock lock indicator 320 may be illuminated in a green color, indicating the vehicle restraint 360 is properly engaged, and thus the processor 112 will determine that the status of the dock lock indicator 320 is in an acceptable condition.

With respect to the status of the dock plate 310 in step 440, the processor 112 can, for example, compare the position or location of the dock plate 310 with the position or location of the trailer 340. In some forms, this comparison is aided by the use of fiducial markers. As mentioned above, the purpose of the dock plate 310 is to bridge the gap between the trailer 340 and the loading dock opening 330, so if the edge of dock plate 310 is not in contact with the edge of the trailer 340, the processor 112 will determine that the status of the dock plate 310 is in an unacceptable condition in step 455. In one embodiment, the processor 112 can be preprogrammed with a set of known data for the angle and elevation of the dock plate 310. In one instance, the angle of the dock plate 310 may be such that it does not provide a level surface relative to the trailer 340, and thus, the processor 112 will determine that the status of the dock plate 310 is in an unacceptable condition. In one instance, the height of the dock plate 310 may be above a threshold value resulting in an uneven or otherwise unsafe bridge between the trailer 340 and loading dock opening 330, and thus, the processor 112 will determine that the status of the dock plate 310 is in an unacceptable condition. In another instance, the processor 112 may determine that the dock plate 310 is wet or covered in ice based on the reflectivity sensed by the front facing sensor 190 or the rear facing sensor 192, and thus, the processor 112 will determine that the status of the dock plate 310 is in an unacceptable condition.

For determining the status of the light gap 332 in step 440, the processor 112 determines a width value for the width of the light gap 332 and then compares this width value to a threshold width value in step 455. In some forms, the width value for the width of the light gap 332 can be determined with the help of one or more fiducial markers. As mentioned above, the width value of the light gap 332 can indicate if the trailer 340 is correctly aligned with the loading dock opening 330. For instance, if the light gap 332 is greater than the threshold width value, then the trailer 340 is not properly aligned with the loading dock opening 330. Accordingly, if the processor 112 determines that the light gap 332 is greater than the threshold width value, the status of the light gap 332 will be determined to be in an unacceptable condition. In some instances, the light gap 332 will be less than the threshold width value, which indicates that the trailer 340 is properly aligned to the loading dock opening 330, and thus, the processor 112 will determine that the status of the light gap 332 is in an unacceptable condition.

With respect to determining the status of the dock door in step 440, the processor 112 determines a distance value of the distance between the dock door indicator 345 and the dock plate 310 (and/or a corresponding second dock door indicator). The distance value can indicate whether the dock door is fully closed, partially open, or fully open. Accordingly, if the processor 112 determines that the dock door is fully closed or only partially open, the status of the dock door indicator 345 and/or the dock door will be determined to be in an unacceptable condition in step 455. In another instance, if the processor 112 determines that the dock door is substantially fully open, the status of the dock door indicator 345 and/or the dock door will be determined to be in an acceptable condition in step 455.

In some forms, the processor 112 can also determine, in step 455, whether the material handling vehicle 100 will collide with the dock door based on a number of inputs and/or sensed values. For example, the processor 112 can be preprogrammed with, or determine the total height of the highest point on the material handling vehicle 100, the processor 112 can acquire or determine the current speed of the material handling vehicle 100, the processor 112 can determine the height of the dock door as described above, the processor 112 can determine the height of the loading dock opening 330, and the processor 112 can determine the speed that the dock door is currently moving. Further, the processor 112 can acquire or determine an orientation of the material handling vehicle 100 relative to the loading dock opening 330. Additionally, the processor 112 can acquire or determine whether the material handling vehicle 100 is moving toward or away from the loading dock opening 330. Based on one or more of the aforementioned values, the processor 112 can determine if the material handling vehicle 100 is on a course for collision with, or near collision with, the dock door before the dock door has been fully raised. Accordingly, the status of the dock door will be determined to be in an unacceptable condition in step 455. If, on the other hand, the processor 112 determines that the material handling vehicle 100 will not collide with the dock door based on the currently sensed/determined conditions, the dock door status can be determined to be in an acceptable condition in step 455. In some forms, if the dock door is determined to be moving at all, the dock door will be determined to be in an unacceptable condition in step 455.

In some embodiments, step 455 can also include a determination of the vehicle orientation, drive direction, speed, and/or distance with respect to the other loading dock component status determinations. Accordingly, even if the status determination of any or all of the loading dock components corresponds with an unacceptable condition, the material handling vehicle 100 might be traveling in a direction or be positioned at a distance which makes the unacceptable condition irrelevant. For example, if the material handling vehicle is away from the loading dock 300 at a distance value that is above a distance threshold (such as 100 ft), stopped, traveling away from the loading dock 300, or traveling on a course that will not result in any interaction between the material handling vehicle 100 and the loading dock 300, the processor 112 can disregard the detected loading dock components and loading dock component statuses and move to step 460 for the sensors 190, 192 to continue scanning for loading dock components.

In step 450, if the processor 112 determines the presence of any loading dock component as being in an unacceptable condition in step 435 or determines that the status of any of the docking components is in an unacceptable condition in step 455, the feedback device 180 is activated. The activation of the feedback device 180 alerts the operator to a condition or obstruction that can inhibit, or otherwise might make unsafe, the loading or unloading of cargo or the operation of the material handling vehicle 100. As one example, if the dock lock indicator 320 is not illuminated or the dock lock indicator 320 is illuminated in a red color, the vehicle restraint 360 is not properly engaged, and so the detection of either of these two conditions will result in the status of the dock lock indicator 320 being determined to be in an unacceptable condition by the processor 112. Upon detection of the dock lock indicator 320 as being in an unacceptable condition, the feedback devices 180, in one embodiment, may flash a warning on the display module 122 that communicates that the vehicle restraint 360 is not engaged. Accordingly, the flash warning notifies the operator of the material handling vehicle 100 of the unsafe condition of the trailer 340. In some forms, the feedback devices 180 include one or more illumination elements that can be illuminated in a plurality of colors.

In some other forms, the feedback device 180 may sound an auditory alarm or siren to notify the operator that there is an unsafe condition ahead. In some instances, when the material handling vehicle 100 is inside the trailer 340, and a trailer pop up or landing gear collapse event occurs, as mentioned above, the dock plate 310 will no longer be level. Accordingly, the processor 112 will determine that the status of the dock plate 310 is in an unacceptable condition. Accordingly, the feedback devices 180 will sound an auditory alarm or siren to signify to other workers of the loading dock separation accident.

In some forms, the processor 112 activates the feedback device 180 after determining any of the acceptable conditions described above in addition to, or in place of, activating the feedback device 180 after determining the unacceptable conditions. Further, in some forms, step 430 and step 435 are omitted from the method 400, and in some forms, steps 440 and 455 are omitted from the method 400. Accordingly, the processor 112 may skip the steps of determining the presence or absence of various loading dock components, or the processor 112 may only determine the presence or absence of various loading dock components and will not also determine if the status of the loading dock component is in an acceptable or an unacceptable condition.

In some embodiments, the processor 112 is communicatively coupled with the vehicle braking system. Therefore, in place of, or in combination with, the activation of the feedback device 180, the processor 112 can control the speed of the material handling vehicle 100 in response to the status of any of the loading dock components being in an unacceptable condition. For example, if the processor 112 determines, based on one or more of the highest point on the material handling vehicle 100, the current speed and direction of the material handling vehicle 100, the height of the loading dock opening 330, the height of the dock door, and the speed that the dock door is currently moving that the material handling vehicle 100 will collide with, or nearly collide with, the dock door, the processor 112 can activate the vehicle braking system to decelerate and/or stop the material handling vehicle 100 to prevent a collision with the dock door. In some embodiments, rather than braking, the processor 112 will set a limit on the maximum vehicle speed.

Similarly, if the processor 112 determines that the width value for the width of the light gap 332 is greater than the threshold value, and thus, the trailer 340 is misaligned with, or separated from the loading dock 300, the processor 112 can activate the vehicle braking system to decelerate and/or stop the material handling vehicle 100 to prevent the material handling vehicle 100 from driving into the gap between the trailer 340 and the loading dock 300. The processor 112 can also activate the vehicle braking system to decelerate and/or stop the material handling vehicle 100, or set a vehicle speed limit, in response to any other unacceptable loading dock component status, such as if the processor 112 determines the dock lock indicator 320 is illuminated in a red color or if the processor 112 determines that the dock plate 310 is misaligned or covered in ice.

It is contemplated that the processor 112 can be programmed, or the functions can be customized, by way of a user interface on the display module 122 or via a user interface of a mobile device that is in wired or wireless communication with the processor 112. For example, the loading dock components detected by the sensors 190, 192, the acceptable reference conditions and the unacceptable reference conditions, and the outputs of the feedback devices 180 can be selectively customizable by a user depending on the unique configuration of the loading dock 300. For example, the loading dock may have specific fiducial markers that the user can select for the sensors 190, 192 to recognize in order to determine the presence or absence of, or status of, the loading dock components. For example, some loading docks may not have the dock lock indicator 320, but they do have a similar indicator to let operators know that the trailer 340 is properly restrained. Accordingly, the user can provide these inputs to the processor 112 for proper recognition. Also, in some forms, the user may want to define additional specialized hazards related to the loading dock components that define unacceptable reference conditions and give rise to an output by the feedback devices 180. Further, the user can select whether the output from the feedback devices 180 is auditory only, visual only, haptic only, a certain volume, a certain color, etc. Accordingly, the processor 112 can be configured to recognize or not recognize any or all of the above-mentioned loading dock components and conditions, recognize additional loading dock components and loading dock component statuses not mentioned above, and provide customized outputs from the feedback devices 180.

In other embodiments, other configurations are possible. For example, those of skill in the art will recognize, according to the principles and concepts disclosed herein, that various combinations, sub-combinations, and substitutions of the components discussed above can provide appropriate control for a variety of different configurations of material handling vehicles, work machines, operator control systems, and so on, for a variety of applications.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A method for determining a loading dock status, comprising:
  scanning, with a sensor mounted onboard a material handling vehicle, a loading dock for one or more loading dock components;
  determining, with a processor mounted onboard the material handling vehicle, a presence status for each of the one or more loading dock components based on data from the sensor and preprogrammed reference conditions pertaining to each of the one or more loading dock components;
  notifying a vehicle operator via a sensory feedback device if one or more of the loading dock components is in an unacceptable absent condition or an unacceptable present condition;
  determining a functional status, based on data from the sensor and the preprogrammed reference conditions, of each of the one or more loading dock components determined to be in an acceptable present condition; and
  notifying the vehicle operator via the sensory feedback device if at least one of the one or more loading dock components is in an unacceptable functional condition.

2. The method of claim 1, wherein the functional status is whether an illumination element of a loading dock lock indicator is one of illuminated or not illuminated, and the unacceptable functional condition is a lack of illumination of the illumination element.

3. The method of claim 1, wherein the functional status is whether an illumination element of a loading dock lock indicator is illuminated in one of a first color or a second color, and the unacceptable functional condition is the illumination element being illuminated in the second color.

4. The method of claim 1, wherein the one or more loading dock components includes a dock plate, and the unacceptable absent condition is the absence of the dock plate.

5. The method of claim 1, wherein the functional status is a height of a dock plate, and the unacceptable functional condition is the dock plate being one of higher or lower than a threshold height value.

6. The method of claim 1, wherein the functional status is a width value of a light gap between a docking vehicle and a dock door, and the unacceptable functional condition is the width value of the light gap being greater than a threshold gap width value.

7. The method of claim 1, wherein data from the sensor comprises image data captured from a camera of the material handling vehicle.

8. The method of claim 1, wherein the sensory feedback device is one or more of an auditory alarm or a visual alarm.

9. The method of claim 1, wherein
  the one or more loading dock components includes a dock plate, and
  the dock plate is one of a hydraulic, pneumatic, or mechanical dock leveler.

10. A dock door safety detection system for a material handling vehicle comprising:
  a vision system that includes:
    one or more sensors mounted onboard the material handling vehicle and configured to detect one or more loading dock components, and a processor configured to determine a status of the one or more loading dock components, and a drive direction of the material handling vehicle, wherein the processor is communicatively coupled to the one or more sensors; and a feedback device configured to provide a notification in response to the processor determining that the one or more loading dock components is in one or more of an unacceptable absent condition, an unacceptable present condition, and an unacceptable functional condition, the notification being one or more of visual, auditory, or tactile, wherein the processor is configured to disregard the determination of the one or more loading dock components being in the unacceptable absent condition, the unacceptable present condition, or the unacceptable functional condition if the material handling vehicle is traveling away from the loading dock.

11. The dock door safety detection system of claim 10, wherein the feedback device includes an illumination element, the notification is whether the illumination element is one of illuminated or not illuminated, and a lack of illumination of the illumination element indicates that the one or more loading dock components is in the unacceptable functional condition.

12. The dock door safety detection system of claim 10, wherein the feedback device is an illumination element, the notification is whether the illumination element is illuminated in one of a first color or a second color, and the illumination element being illuminated in the second color indicates that the one or more loading dock components is in the unacceptable functional condition.

13. The dock door safety detection system of claim 10, wherein the processor is configured to determine a distance value between the material handling vehicle and the one or more loading dock components and disregard the status of the loading dock if the distance value is above a distance threshold.

14. The dock door safety detection system of claim 10, wherein the unacceptable functional condition is determined by way of the processor comparing a detected condition of the one or more loading dock components to an unacceptable condition reference.

15. The dock door safety detection system of claim 14, wherein the unacceptable condition reference is configurable via a user interface of a mobile device.

16. The dock door safety detection system of claim 10, wherein the processor is configured to determine a dock plate height and indicate the unacceptable functional condition if the dock plate height is one of higher or lower than a threshold value.

17. The dock door safety detection system of claim 10, wherein the processor is configured to determine a width value of a light gap between the material handling vehicle and a dock door and indicate the unacceptable functional condition if the width value of the light gap is greater than a threshold gap width value.

18. A material handling vehicle comprising:

a processor communicatively coupled to a sensor and configured to determine a readiness status of a loading dock based on data from the sensor, the readiness status including a presence verification of a loading dock component, and a functional status of the loading dock component; and a feedback device communicatively coupled to the processor and configured to provide a notification, the notification being one or more of visual, auditory, or tactile based on the readiness status of the loading dock.

19. The material handling vehicle of claim 18, further comprising one or more of a body, an operator cab, a seat, or a mast, wherein one or more of the processor, the sensor, or the feedback device are selectively attachable to one or more of the body, the operator cab, the seat, or the mast.

\* \* \* \* \*